(12) United States Patent
Sinzig et al.

(10) Patent No.: US 8,646,378 B2
(45) Date of Patent: Feb. 11, 2014

(54) BREWING DEVICE FOR A COFFEE MACHINE

(75) Inventors: Peter Sinzig, Moosseedorf (CH); Fabian Salzmann, Köniz (CH)

(73) Assignee: Schaerer AG, Zuchwil (CH)

( * ) Notice: Subject to any disclaimer, the term of this patent is extended or adjusted under 35 U.S.C. 154(b) by 398 days.

(21) Appl. No.: 13/051,015

(22) Filed: Mar. 18, 2011

(65) Prior Publication Data
US 2011/0232499 A1    Sep. 29, 2011

(30) Foreign Application Priority Data
Mar. 29, 2010  (EP) ..................................... 10158164

(51) Int. Cl.
*A47J 31/44*    (2006.01)
*A47J 31/42*    (2006.01)

(52) U.S. Cl.
USPC ................. 99/279; 99/297; 99/286; 99/289 R

(58) Field of Classification Search
USPC ........ 99/286, 279, 289 R, 280, 291, 293, 295
See application file for complete search history.

(56) References Cited

U.S. PATENT DOCUMENTS

| | | | |
|---|---|---|---|
| 5,007,333 A * | 4/1991 | Sager | 99/286 |
| 2002/0082126 A1* | 6/2002 | Brundage | 473/457 |
| 2007/0012194 A1* | 1/2007 | Oehninger | 99/279 |

FOREIGN PATENT DOCUMENTS

| | | |
|---|---|---|
| DE | 38 43 568 C1 | 12/1989 |
| DE | 3843568 | 12/1989 |
| EP | 0528758 | 2/1993 |
| EP | 0528758 A1 | 2/1993 |
| EP | 2 080 456 A1 | 7/2009 |

OTHER PUBLICATIONS

European Search Report dated Aug. 31, 2010.

\* cited by examiner

*Primary Examiner* — Jianying Atkisson
(74) *Attorney, Agent, or Firm* — Pearne & Gordon LLP

(57) ABSTRACT

A brewing device (1) for a coffee machine comprises a brewing cylinder (2) with a cylindrical bore (3), an upper piston (5) and a lower piston (4), by means of which the brewing cylinder (2) is able to be closed off to form a brewing chamber (6). The surface of the upper piston (5) and of the lower piston (4) facing the brewing chamber (6) is provided in each case with a sieve (11, 12), through which hot water is able to be conducted into the brewing chamber (6) or coffee is able to be discharged from the brewing chamber (6) in each case via a connecting channel (7, 8) provided in the respective piston (4, 5). At least one of the sieves (11, 12) is installed on a supporting structure (9, 10) that is placeable on one of the pistons (4, 5) and is lockable therewith. The respective supporting structure (9, 10) is provided with a connecting element (13, 14), which is connectable in a sealed way to the connecting channel (7, 8) of the respective piston (4, 5). By means of this arrangement the sieve can be easily taken out of the respective piston and put back in again.

15 Claims, 6 Drawing Sheets

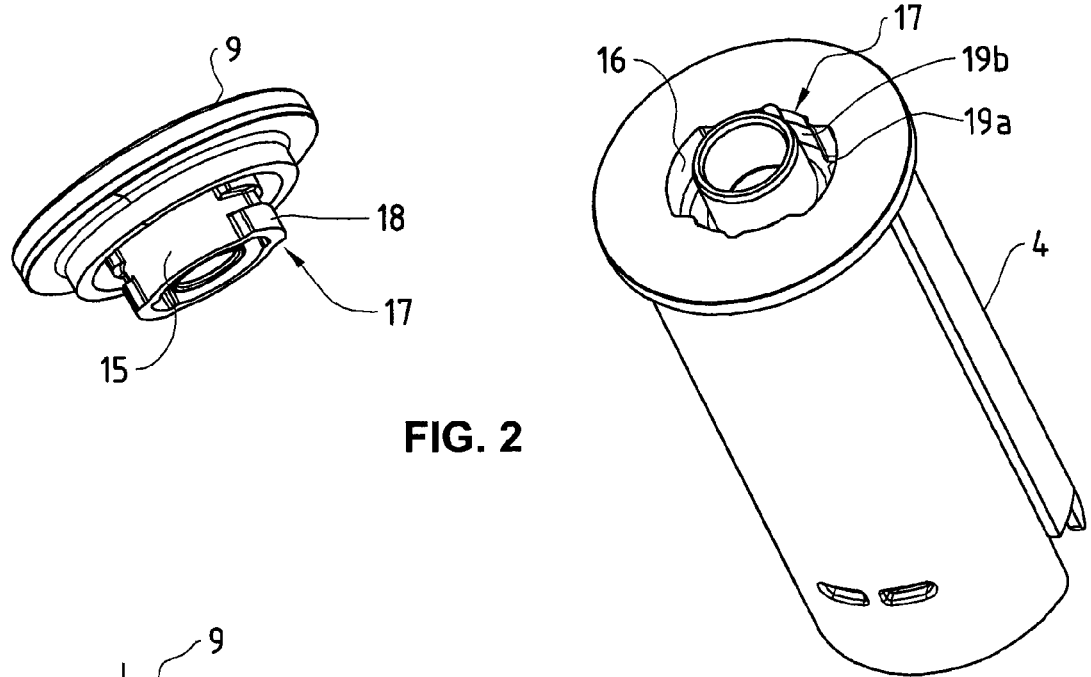
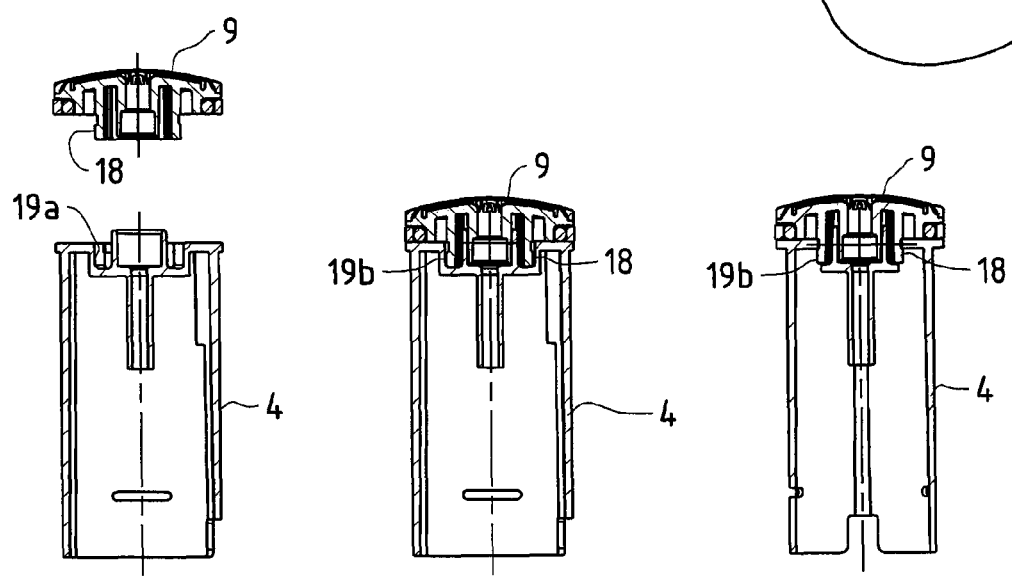
FIG. 2
FIG. 3　　FIG. 4　　FIG. 5

FIG. 10a
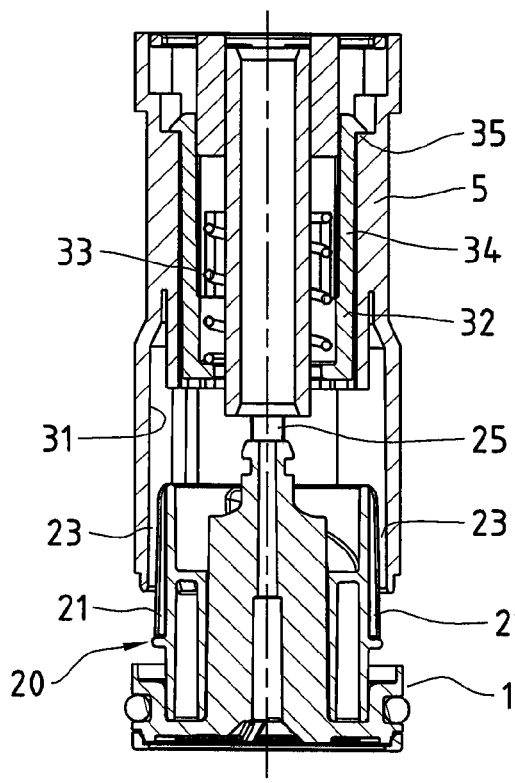
FIG. 10b
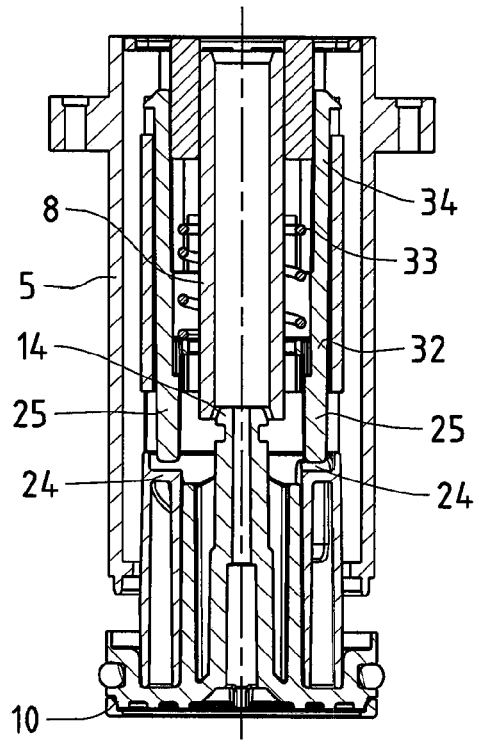
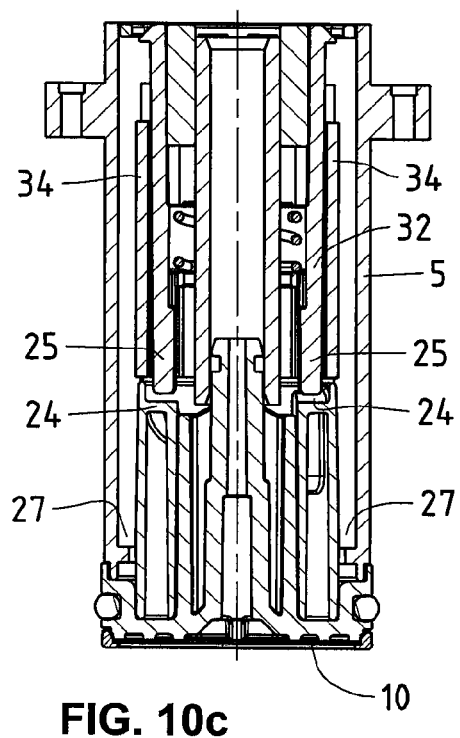
FIG. 10c
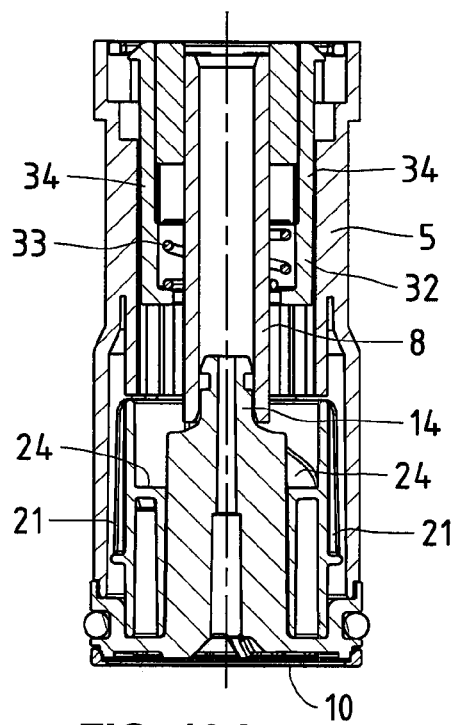
FIG. 10d

BREWING DEVICE FOR A COFFEE MACHINE

This invention relates to a brewing device for a coffee machine comprising a brewing cylinder with a cylindrical bore, an upper piston and a lower piston, by means of which the brewing cylinder is able to be closed off to form a brewing chamber, the brewing cylinder and the pistons being displaceable relative to one another and drivable, and the surface of the upper piston and of the lower piston facing the brewing chamber being provided in each case with a sieve, through which hot water is able to be conducted into the brewing chamber or coffee is able to be discharged from the brewing chamber in each case via a connecting channel provided in the respective piston.

Such brewing devices for coffee machines are known. Thus EP 0 528 758 B1 shows such a brewing device, for example, in which the brewing chamber is formed by a brewing cylinder and an upper and lower piston. The upper piston is thereby stationary; the brewing cylinder and the lower piston are drivable, controlled via a correspondingly disposed spindle. For filling the ground coffee into the brewing chamber, the lower piston and the brewing cylinder are situated in the lower position. The ground coffee is filled into the brewing chamber via a pivotable funnel. The brewing cylinder and the lower piston drive upward during the pivoting away of the funnel. The brewing cylinder is closed off by the upper piston. Hot water is conducted into the closed brewing chamber. The brewed coffee is dispensed into a cup via corresponding lines.

The upper piston and the lower piston are covered with a sieve, to achieve an optimal distribution of the supplied hot water and a guiding away of the brewed coffee. For this purpose the brewing chamber and in particular the sieves of the two pistons must be cleaned from time to time.

In order to be able to carry out a thorough cleaning, it is required that the sieves be removed from the piston, which can be done in each case by unscrewing of the corresponding screw connections using the required tools. It can also be necessary for the sieves to be replaced after longer use. This cleaning and replacement of the sieves is time-consuming and tedious.

The object of the present invention is thus to design the brewing device with the two pistons in such a way that a simple removal of the sieves is possible without additional tools, and a simple cleaning and replacement of these sieves is thereby achievable.

This object is achieved according to the invention in that at least one of the sieves is installed on a supporting structure, which is placeable on one of the pistons and is lockable therewith, and which supporting structure is provided with a connecting element, which is connectable in a sealed way to the connecting channel of the respective piston.

With this design, namely that the pistons are each provided with a supporting structure for the corresponding sieve, these supporting structures being easily insertable in the pistons and removable therefrom, the sieves can be easily removed from the piston disposed in the brewing device, and cleaned or replaced. With this design it is also possible to replace the supporting structures; these can then be replaced by supporting structures which have, for instance, different water supply lines and coffee discharge lines, whereby the quality of the coffee to be brewed can be influenced. The supporting structures with the correspondingly installed sieves can, as has already been mentioned, be inserted into the pistons and removed therefrom very easily, even when the respective pistons are not optimally accessible.

Preferably the supporting structure has a cylindrical region, which is insertable into a corresponding hollow-cylindrical region of the piston and is held via locking means, whereby a simple and economical structure is obtained.

Preferably the locking means are formed by protrusions provided on the cylindrical region of the supporting structure and by longitudinally running recesses provided on the hollow-cylindrical region of the piston as well as recesses, following thereafter, running in circumferential direction. Thereby achieved is an optimal guiding of the supporting structure during insertion into, or respectively removal out of, the piston, which correspondingly simplifies the handling.

Preferably the locked position of the supporting structure in the piston is determined by stop faces, whereby it is indicated when the locked position is reached.

Another advantageous embodiment of the invention consists in that provided on the supporting structure is at least one radially running, helically disposed inclined surface, which co-operates with a bolt, which bolt is disposed in the piston in a way displaceable in axial direction, and whose one front face is pressable into a forward position, via spring means, against the inclined surface. Thereby achieved is that the supporting structure inserted in the piston is pressed into the locked position via the resiliently held bolt.

Preferably the forward position of the bolt is limited by a stop.

Another advantageous embodiment of the invention consists in that provided on the supporting structure are two radially running helically disposed inclined surfaces opposite one another, which co-operate with two bolts, held in the piston and displaceable in axial direction, the one front faces of which are pressable into a forward position, via spring means, against the inclined surfaces. Thereby obtained is an optimal rotation for locking of the supporting structure in the piston; the two bolts, pressed against the inclined surfaces via spring means, complement one another in an optimal way.

Preferably the two bolts are installed running parallel on an annular support element in a way diagonally opposite one another, which support element encloses the axially running connecting channel, and which support element is impinged by a compression spring enclosing the connecting channel, which spring is supported by crosspieces held by the connecting channel. A simple structure is obtained through this arrangement.

Another advantageous embodiment of the invention consists in that disposed on the support element are hook-shaped elements, which are supported on the stops in the forward position of the support element and thus of the bolts, whereby, in addition to a simple structure, also an optimal operation is achievable.

An embodiment of the invention will be explained more closely in the following, by way of example, with reference to the appended drawings, in which:

FIG. 2 shows in a spatial representation the lower piston with separate supporting structure belonging to the lower piston;

FIGS. 3 to 5 show the individual steps for placement of the supporting structure on the lower piston until the locked position;

FIGS. 10a to 10d are each a sectional representation of the upper piston during the installation of the supporting structure in the upper piston.

Figure 1:
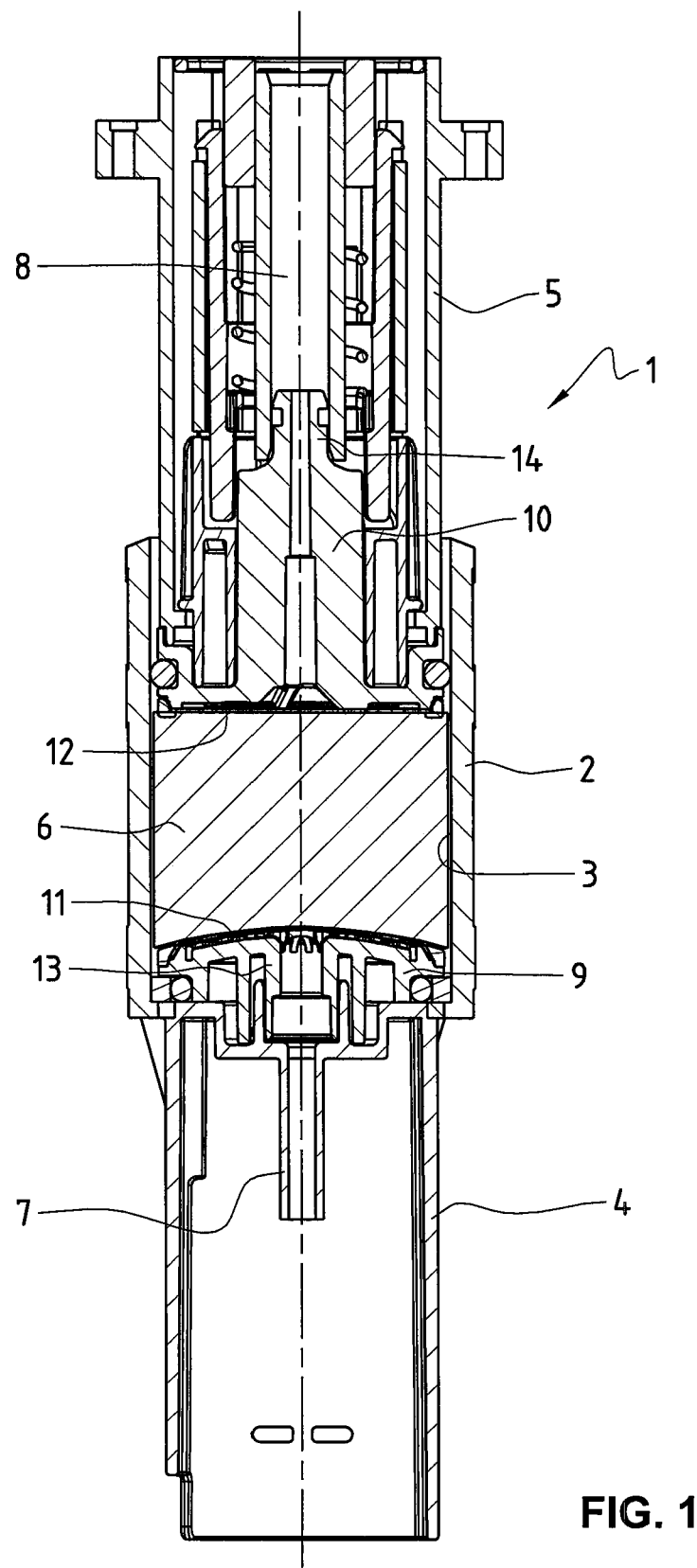
FIG. 1 is a sectional representation of a brewing device for a coffee machine with upper piston, brewing cylinder and lower piston.

As can be seen from FIG. 1, the brewing device 1 for a coffee machine consists in a known way of a brewing cylinder 2, which is provided with a cylindrical bore 3, which cylindrical bore 3 is able to be closed off by a lower piston 4 and an upper piston 5, whereby the brewing chamber 6 is formed in a known way.

In a known way, to make a coffee, the brewing chamber 6 is opened by the brewing cylinder 2 with the lower piston 4 being moved out of the upper piston 5, which is stationary. Ground coffee can then be filled into the brewing chamber 6 in a known way from above by means of a funnel (not shown). The lower piston 4 together with the brewing cylinder move upward until the brewing chamber 6 is closed off by the upper piston 5. Via the connecting channel 7 of the lower piston 4, water is forced into the brewing chamber 6. The coffee brewed in the brewing chamber 6 leaves the brewing chamber 6 through the connecting channel 8 of the upper piston. After the brewing process, the cake of coffee grinds located in the brewing chamber 6 is ejected by moving down of the brewing cylinder 2 and moving up of the lower piston 4.

Detachably placed on the end region of the lower piston 4 turned toward the brewing chamber 6 is a supporting structure 9, as will be described later in detail. Detachably placed on the end region of the upper piston 5 turned toward the brewing chamber 6 is also a supporting structure 10, as will likewise be described later in detail. Both supporting structures 9 and 10 are each covered with a sieve 11 or respectively 12, which are fixed to the respective supporting structure 9 or 10 in a known way. Provided in the supporting structure 9 of the lower piston is a connecting element 13, which is connected in a sealed way to the connecting channel 7 of the lower piston, so that the supplied water can reach the brewing chamber 6 via the connecting channel 7, the connecting element 13 and the sieve 11.

In a corresponding way, the supporting structure 10 of the upper piston 5 is likewise provided with a connecting element 14, which is correspondingly connected in a sealed way to the connecting channel 8 of the upper piston 5, so that the brewed coffee can be discharged through the sieve 12, the connecting element 14 of the upper piston 5 and the connecting channel 8 of the upper piston 5.

The lower piston 4 and the supporting structure 9 separated therefrom can be seen from FIG. 2. The supporting structure 9 has a cylindrical region 15, which can be inserted into a corresponding hollow-cylindrical region 16 of the lower piston 4. In the state of being placed on the lower piston 4, the supporting structure 9 is held via locking means 17. These locking means consist of protrusions 18 provided on the supporting structure 9 and longitudinally running recesses 19a and, following thereafter, circumferentially running recesses 19b, provided on the hollow-cylindrical region 16 of the lower piston 4.

As can be seen from FIGS. 3 to 5, when placing the supporting structure 9 on the lower piston 4, the protrusions 18 are inserted into the longitudinally running recesses 19a of the lower piston 4. The supporting structure 9 is then turned in relation to the lower piston 4; the protrusions 18 end up in the recesses running in circumferential direction 19b. The supporting structure 9 is thereby connected to the lower piston 4 and is situated in the locked state. To release the supporting structure 9 from the lower piston 4, this supporting structure is turned with respect to the lower piston 4 until the protrusions 18 end up in the longitudinally running recesses 19a. The supporting structure 9 can then be lifted out of the lower piston 4.

Figure 6:
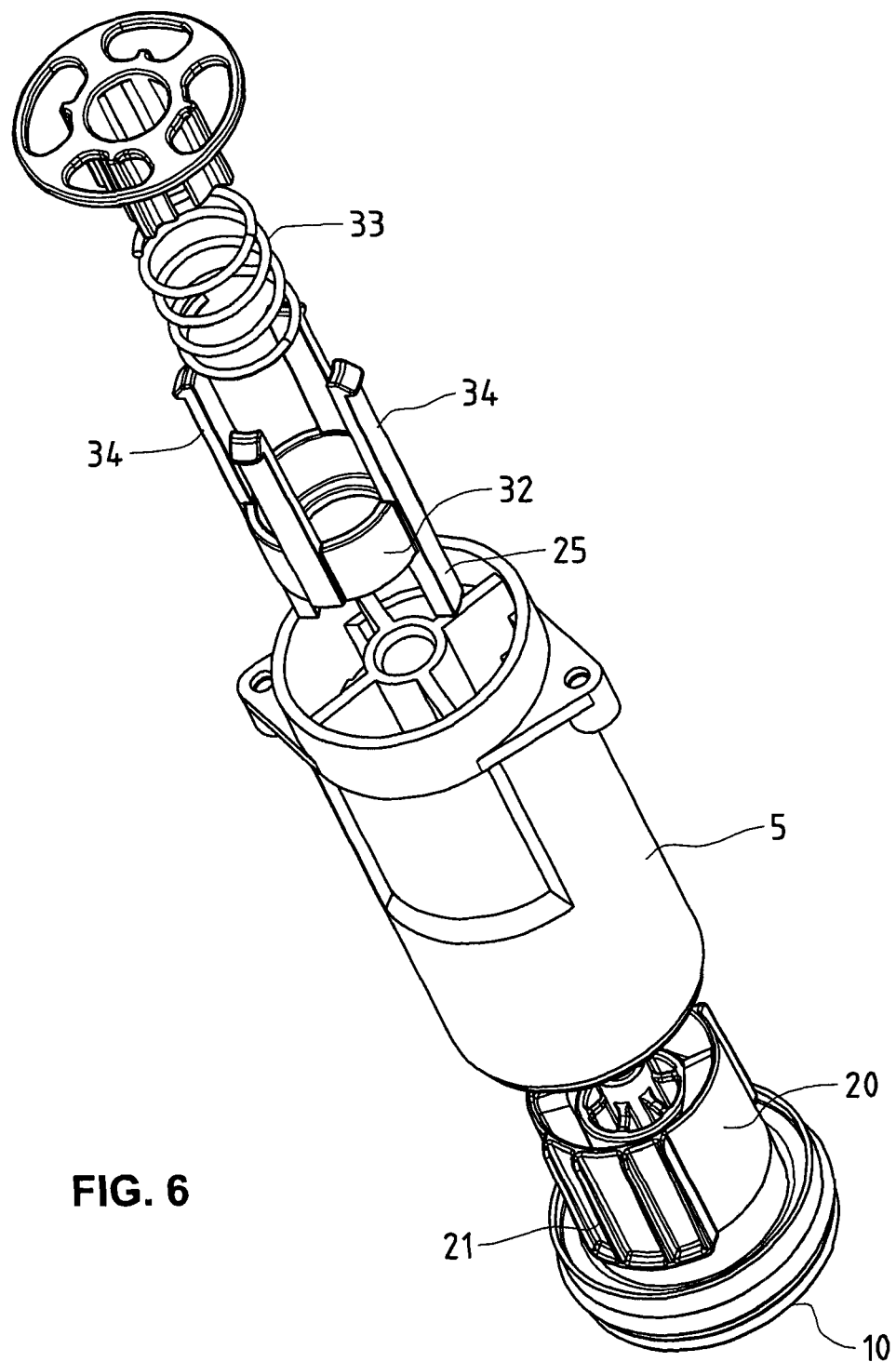
FIG. 6 shows in a spatial representation the upper piston with individual components pulled apart.

FIG. 6 shows the upper piston 5 in a spatial representation, the supporting structure 10 being moved out of the upper piston 5, and moreover the further components being visible in separate representation. The supporting structure 10 also has a cylindrical region 20 on which the locking means are provided in the form of protrusions 21. As will be seen later, for insertion of the supporting structure 10 into the upper piston 5, these protrusions are moved into recesses that are disposed running longitudinally. By rotation of the supporting structure 10, the protrusions 21 subsequently end up in recesses running in circumferential direction, whereby the locking takes place.

The supporting structure 10 of the upper piston 5 is automatically pulled into the locked position in the embodiment shown here, as will be subsequently described.

The mode of operation of this automatic locking is shown schematically in FIGS. 7a to 7d. The supporting structure 10 is moved into the upper piston 5, shown in FIG. 7a. The lateral surface 22 of the protrusion 21 hereby reaches the recess 23 of the upper piston 5, and is led in longitudinal direction, as can be seen from FIG. 7b. During the moving of the supporting structure 10 into the upper piston 5, an inclined surface 24 provided on the supporting structure 10 comes into contact with a longitudinally displaceable bolt 25, which is pressed via spring means 26 against the inclined surface 24 of the supporting structure 10.

Figure 7A:
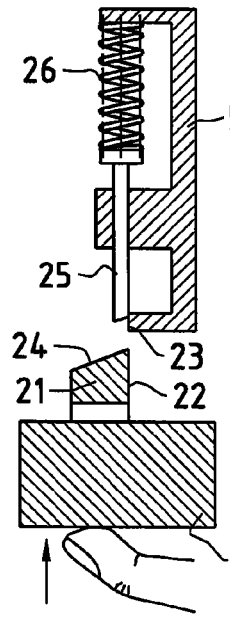
FIGS. 7a to 7d show in a diagrammatic section the mode of operation of installing the supporting structure in the upper piston with automatic locking.
Figure 7B:
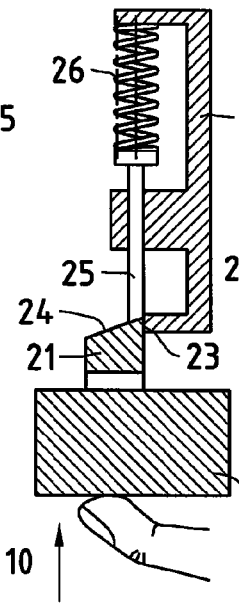
Figure 7C:
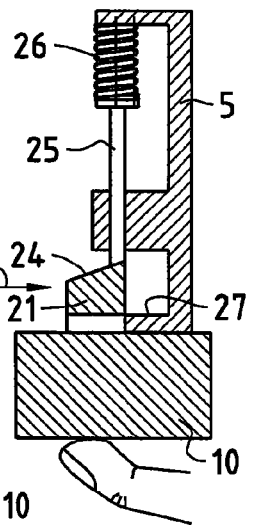
Figure 7D:
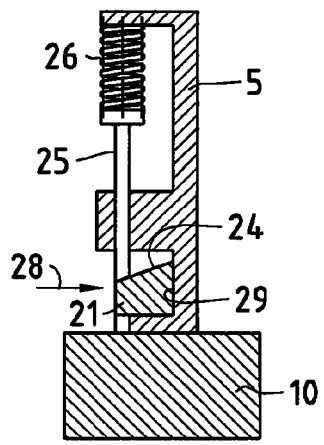
Figure 8D:
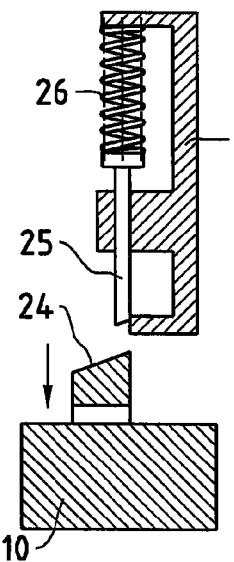
FIGS. 8a to 8d show in a diagrammatic section the mode of operation of removal of the supporting structure from the upper piston.
Figure 8C:
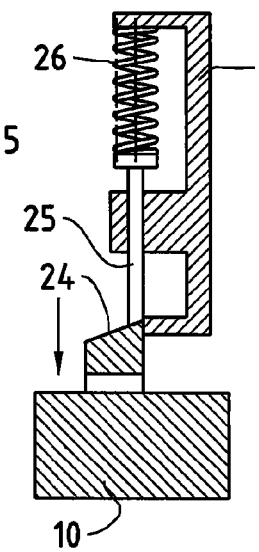
Figure 8B:
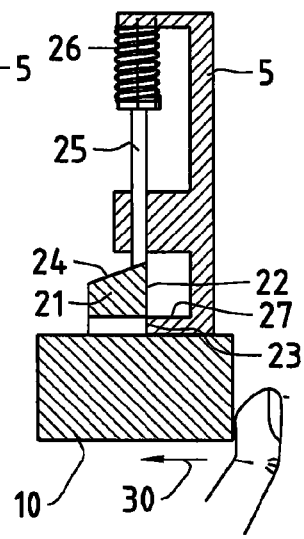
Figure 8A:
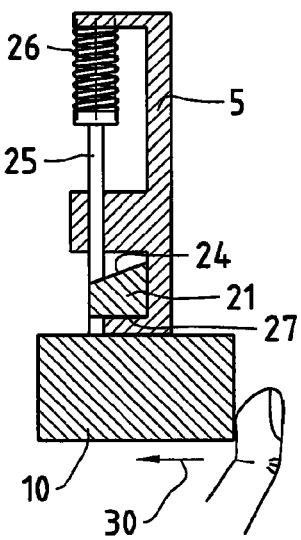

The bolt 25 yields upwardly, as can be seen in FIGS. 7b and 7c; the supporting structure 10 is pressed into the upper piston 5 until the protrusion 21 ends up in the circumferentially running recess 27, and can be displaced horizontally in the direction of the arrow 28, brought about by the resilient pressing of the bolt 25 on the inclined surface 24 of the supporting structure 10. The supporting structure 10 is thereby shifted until the protrusion 21 comes to abut a stop face 29 of the upper piston 5. The supporting structure 10 is hereby located in the locked position and will be kept in this position.

The removal of the supporting structure 10 from the upper piston 5 is shown schematically in FIGS. 8a to 8d. The supporting structure 10 is displaced here in relation to the upper piston 5 in the direction of the arrow 30. Via the inclined surface 24, the bolt 25 is pressed upward against the resilient force of the spring means 26 until the lateral surface 22 is aligned with the recess 23. The spring means 26 press the bolt 25 against the inclined surface 24. The protrusion 21 of the supporting structure 10 can run downward along the recess 23. The supporting structure 10 is ejected from the upper piston 5, and can be removed.

Figure 9:
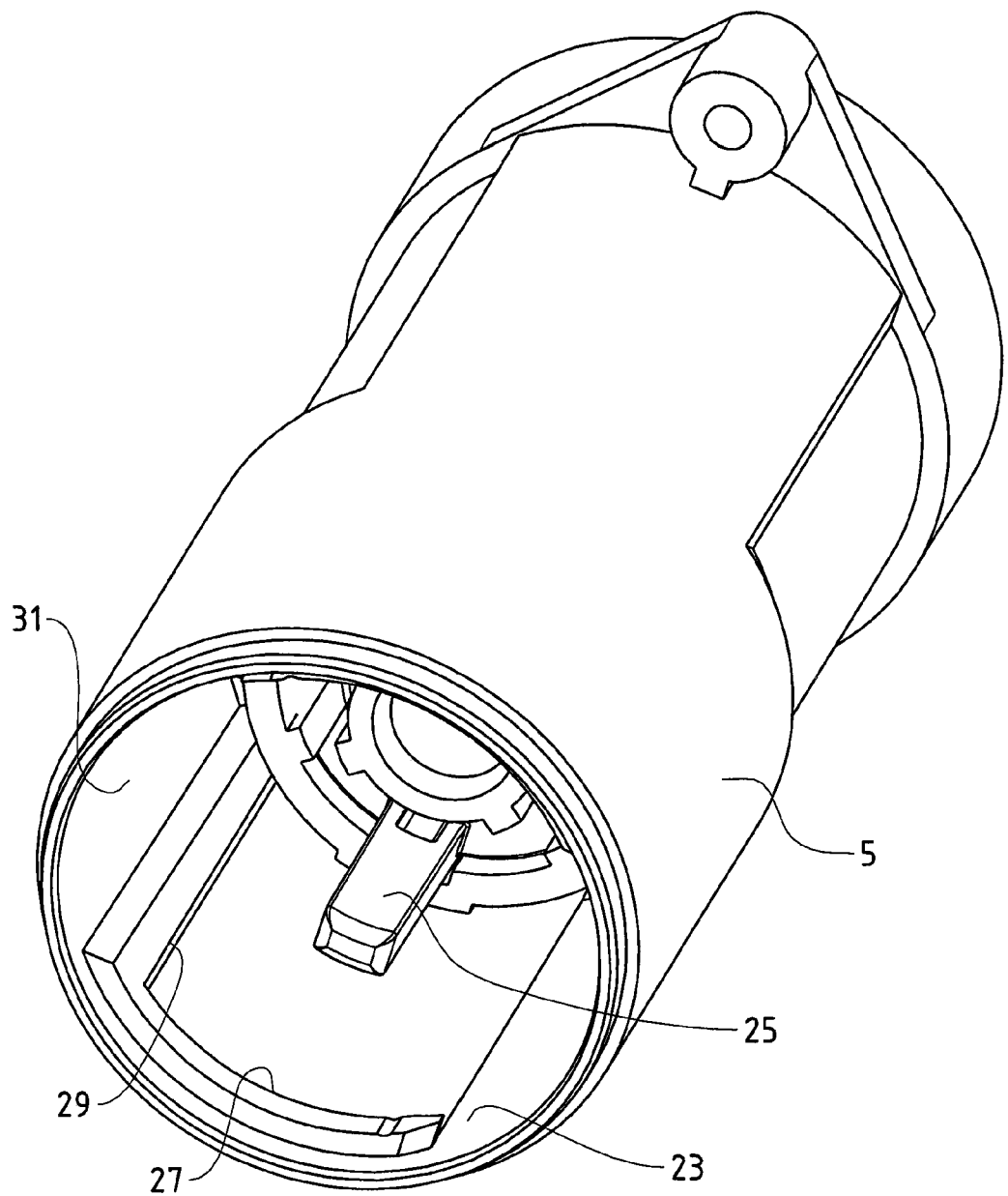
FIG. 9 is a spatial representation of the upper piston with supporting structure removed.

FIG. 9 shows in a spatial representation the upper piston 5 with supporting structure 10 removed. The hollow-cylindrical region 31 is provided in this upper piston 5. The longitudinally running recess 23 and the recess 27 running in circumferential direction can be seen in this hollow-cylindrical region 31. Likewise visible in this hollow-cylindrical region 31 is one of the two bolts 25, which are pressed resiliently downward. Also visible is the stop face 29, which limits the locked position of the supporting structure.

The insertion of the supporting structure 10 into the upper piston 5 can be seen from FIGS. 10a to 10d. According to FIG. 10a, the supporting structure 10 with its cylindrical region 20 is inserted into the hollow-cylindrical region 31 of the upper piston 5. The protrusions 21 of the supporting structure 10 are guided by the longitudinally running recesses 23 against rotation. The bolts 25 are located in the forward position. As can be seen from FIG. 6, the two bolts 25 are held on an annular support element 32, which encloses the axially running connecting channel 8 of the upper piston 5. This annular support element 32 is pressed into the forward position via a compression spring 33. Provided on the annular support element 32 are hook-shaped elements 34, which form stop elements.

As can be seen from FIG. 10a, the annular support element 32, with the bolts 25 installed thereon, is located in the forward position, which is limited by the hook-shaped elements 34, which support themselves on stops 35, provided on the upper piston 5. The annular support element 32 is pressed into the forward position via the compression spring 33.

As can be seen from FIG. 10b, in which the upper piston 5 and the supporting structure 10 are rotated by 90° with respect to the representation according to FIG. 10a, the supporting structure 10 is pressed further into the upper piston 5. The bolts 25 support themselves on the inclined surfaces 24 of the supporting structure 10, and are pressed into the upper piston 5 together with the annular support element 32 and the hook-shaped elements 34. With this further pressing in, the connecting element 14 of the supporting structure 10 ends up in the connecting channel 8 of the upper piston 5.

The supporting structure 10 is pushed completely into the upper piston 5, as illustrated in FIG. 10c. The bolts 25 are pushed back completely. The protrusions end up in the region of the recess 27 running in circumferential direction (FIG. 9), likewise illustrated in FIG. 10d, in which the upper piston 5 and the supporting structure 10 are rotated again by 90° with respect to the representation according to FIG. 10c. Through the pressure of the bolts 25 on the inclined surfaces 24, a turning moment occurs on the supporting structure 10; since the protrusions 21 of the supporting structure 10 are located in the region of the recess 27 running in circumferential direction (FIG. 9), the supporting structure 10 is rotated until the protrusions 21 come to abut the stop faces 29. The supporting structure 10 is locked with the upper piston 5. The connecting element 14 is connected to the connecting channel 8 of the upper piston 5 in a sealed way. The upper piston 5 can thus be used to make a coffee.

For removal of the supporting structure 10 from the upper piston 5, one proceeds in reverse sequence, according to the procedure as it has been described with reference to FIGS. 8a to 8d.

In the preceding description, a simple connection has been shown for the lower piston and the supporting structure installed on this lower piston, while a practically automatic locking mechanism was described for the upper piston and the supporting structure insertable therein. Of course it would be conceivable for both pistons with the corresponding supporting structure to be each provided with a simplified mechanism. However both pistons with a supporting structure with a practically automatic locking device could also be used. Ideally, the practically automatic locking mechanism is used where access to the piston for insertion of the supporting structure is impeded.

Obtained with this design according to the invention is a brewing device in which the sieves installed on the respective pistons are able to be replaced in the simplest way, whether this is for cleaning of the sieves or whether this is done in order to change the water feed or the discharge of the brewed coffee and adapt it to the coffee to be dispensed, if applicable, through corresponding configuration of the water channels in the supporting structures.

The invention claimed is:

1. A brewing device for a coffee machine, comprising arranged along a common cylinder axis a brewing cylinder with a cylindrical bore, an upper piston and a lower piston, by means of which the brewing cylinder is able to be closed off to form a brewing chamber, the brewing cylinder and the pistons being displaceable relative to one another and drivable in an axial direction along the cylinder axis, and a surface of the upper piston and of the lower piston facing the brewing chamber being provided in each case with a sieve, through which hot water is able to be conducted into the brewing chamber or coffee is able to be discharged from the brewing chamber in each case via a connecting channel provided in the respective piston, wherein at least one of the sieves is installed on a supporting structure, which is insertable into one of the pistons in the axial direction, and is lockable therewith, and which supporting structure is provided with a connecting element, which is connectable in a sealed way to the connecting channel of the respective piston, wherein provided on the supporting structure is an inclined surface, and wherein held in the piston is a bolt that extends and is displaceable in the axial direction under the force of a spring, whereby a face of said bolt presses under said force of said spring against said inclined surface of said supporting structure, when said supporting structure is inserted into said piston.

2. The brewing device for a coffee machine according to claim 1, wherein the supporting structure has a cylindrical region, which is insertable into a corresponding hollow-cylindrical region of the piston and is held via a locking device.

3. The brewing device for a coffee machine according to claim 2, wherein the locking device is formed by protrusions provided on the cylindrical region of the supporting structure and by longitudinally running recesses provided on the hollow-cylindrical region of the piston as well as recesses, following thereafter, running in a circumferential direction.

4. The brewing device for a coffee machine according to claim 1, wherein the locked position of the supporting structure in the piston is determined by a stop face.

5. A brewing device for a coffee machine, comprising arranged along a common cylinder axis a brewing cylinder with a cylindrical bore, an upper piston and a lower piston, by means of which the brewing cylinder is able to be closed off to form a brewing chamber, the brewing cylinder and the pistons being displaceable relative to one another and drivable in an axial direction along the cylinder axis, and a surface of the upper piston and of the lower piston facing the brewing chamber being provided in each case with a sieve, through which hot water is able to be conducted into the brewing chamber or coffee is able to be discharged from the brewing chamber in each case via a connecting channel provided in the respective piston, wherein at least one of the sieves is installed on a cylindrical supporting structure, which is insertable into one of the pistons in the axial direction, and is lockable therewith, and which supporting structure is provided with a connecting element, which is connectable in a sealed way to the connecting channel of the respective piston, wherein provided on the supporting structure are two radially running helically disposed inclined surfaces opposite one another along a diameter of said cylindrical supporting structure, and wherein held in the piston are two bolts each disposed in a way extending and displaceable in the axial direction under the force of a spring, whereby a face of each of said bolts presses under the force of said spring against a respective of said inclined surfaces of said supporting structure, when said supporting structure is inserted into said piston.

6. The brewing device for a coffee machine according to claim 5, wherein the two bolts are installed running parallel on an annular support element opposite one another transverse to the axial direction, said annular support element encloses the axially running connecting channel and said annular support element is impinged by said spring enclosing the connecting channel, said spring being supported by crosspieces held by the connecting channel.

7. The brewing device for a coffee machine according to claim 6, wherein disposed on the support element are hook-shaped elements, which are supported on stops on the piston in one position of the annular support element and thus of the bolts.

8. The brewing device for a coffee machine according to claim 5, wherein the supporting structure has a cylindrical region, which is insertable into a corresponding hollow-cylindrical region of the piston and is held via a locking device.

9. The brewing device for a coffee machine according to claim 8, wherein the locking device is formed by protrusions provided on the cylindrical region of the supporting structure and by longitudinally running recesses provided on the hollow-cylindrical region of the piston as well as recesses, following thereafter, running in a circumferential direction.

10. The brewing device for a coffee machine according to claim 9, wherein the locked position of the supporting structure in the piston is determined by stop faces extending in the axial direction on the piston.

11. The brewing device for a coffee machine according to claim 1, wherein said axial displacement of said bolt under said force of said spring is limited by a stop.

12. The brewing device for a coffee machine according to claim 11, wherein the supporting structure has a cylindrical region, which is insertable into a corresponding hollow-cylindrical region of the piston and is held via a locking device.

13. The brewing device for a coffee machine according to claim 11, wherein the locked position of the supporting structure in the piston is determined by a stop face extending in the axial direction on the piston.

14. The brewing device for a coffee machine according to claim 2, wherein the locked position of the supporting structure in the piston is determined by a stop face extending in the axial direction on the piston.

15. The brewing device for a coffee machine according to claim 3, wherein the locked position of the supporting structure in the piston is determined by a stop face extending in the axial direction on the piston.

\* \* \* \* \*